US008390719B2

(12) United States Patent
Itoh

(10) Patent No.: US 8,390,719 B2
(45) Date of Patent: Mar. 5, 2013

(54) IMAGING DEVICE AND IMAGE METHOD

(75) Inventor: Kei Itoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 368 days.

(21) Appl. No.: 12/708,823

(22) Filed: Feb. 19, 2010

(65) Prior Publication Data

US 2010/0214447 A1 Aug. 26, 2010

(30) Foreign Application Priority Data

Feb. 20, 2009 (JP) ................................. 2009-038308

(51) Int. Cl.
*H04N 5/222* (2006.01)
(52) U.S. Cl. ................................. 348/333.05
(58) Field of Classification Search .............. 348/333.05
See application file for complete search history.

(56) References Cited

U.S. PATENT DOCUMENTS 6,298,144 B1 * 10/2001 Pucker et al. ................. 382/103
2007/0230893 A1 * 10/2007 Meron et al. ....................... 386/4
2010/0045812 A1 * 2/2010 Miyakoshi ................. 348/222.1

FOREIGN PATENT DOCUMENTS

| JP | 5-224287 A | | 9/1993 |
|---|---|---|---|
| JP | 2003274259 A | * | 9/2003 |
| JP | 2005-176246 A | | 6/2005 |

* cited by examiner

*Primary Examiner* — Anthony J Daniels
(74) *Attorney, Agent, or Firm* — Dickstein Shapiro LLP

(57) ABSTRACT

An imaging device includes an imaging section which images a subject, a recording section which stores a plurality of images of the subject imaged by the imaging section, a display section which displays the plurality of images stored in the storing section, a timetable creating section which creates a timetable in which a display time for each of the plurality of images is set and a playback section which continuously plays back the plurality of images according to the timetable created by the timetable creating section, and displays the images on the display section.

7 Claims, 11 Drawing Sheets

IMAGING DEVICE AND IMAGE METHOD

PRIORITY CLAIM

The present application is based on and claims priority from Japanese Patent Application No. 2009-038308, filed on Feb. 20, 2009, the disclosure of which is hereby incorporated by reference in its entirety.

BACKGROUND OF THE INVENTION

1. Field of the Invention

The present invention relates to an imaging device, for example, a digital camera, a camera phone and a portable information device having an imaging function such as a PDA, and an imaging method. More particularly, the present invention relates to an imaging device having a CMOS imaging element enabling high speed continuous shooting.

2. Description of the Related Art

In recent years, an imaging element has been increasingly downsized in order to downsize a digital still camera, and a CMOS (Complementary Metal Oxide Semiconductor) imaging element has been used instead of a conventionally used CCD (Charge Coupled Device) imaging element.

The size of the CMOS imaging element is slightly larger than that of the CCD imaging element, but the CMOS imaging element has an advantage in that it can image at a faster speed than that of the CCD imaging element. In particular, a CMOS imaging element which can shoot up to 240 frames per second is proposed, so that high speed continuous shooting can be performed like a high speed camera.

In high speed continuous shooting, the total number of images to be recorded in a digital still camera is increased. For this reason, it takes time to view a lot of images and to reach a desired image if the images are played back one by one (frame). Accordingly, as a method of displaying images obtained by high speed continuous shooting, it is general to continuously play back the continuously-shot images.

As a method of displaying images obtained by high speed continuous shooting, a technique, which continuously plays back images at a speed according to a shutter speed in shooting, is proposed in JP2005-176246A and JP H05-224287A.

For example, when shooting a milkcrown phenomenon in which a crown shape is formed when a water drop falls in viscous liquid such as milk as illustrated in FIG. 1, it is general to perform continuous shooting in order to definitely capture a moment when the phenomenon occurs.

However, the technique described in JP2005-176246A and JP H05-224287A has the following problem. When continuously playing back continuously-shot images, the moment when the milkcrown phenomenon illustrated in FIG. 1 (4) occurs may be continuously played back at high speed.

On the other hand, when continuously playing back images at low speed in order to confirm the milkcrown phenomenon, time may be wasted till the moment that the milkcrown phenomenon is played back because the milkcrown phenomenon occurs in a short time relative to the total shooting time (total playback time). Accordingly, a technique which can play back a desired image (milkcrown phenomenon) at low speed, and fast-forward the other images (high speed playback) is desired.

SUMMARY OF THE INVENTION

It is, therefore, an object of the present invention to provide an imaging device and an imaging method, which can easily confirm a desired image in continuous playback of images.

In order to achieve the above object, the present invention relates to an imaging device, including: an imaging section which images a subject; a recording section which stores a plurality of images of the subject imaged by the imaging section; a display section which displays the plurality of images stored in the storing section; a timetable creating section which creates a timetable in which display time for each of the plurality of images is set; and a playback section which continuously plays back the plurality of images according to the timetable created by the timetable creating section, and displays the images on the display section.

Preferably, a flag which determines whether or not an image is a continuously-shot image is applied to each of the images, and the images each applied with the flag are stored in the storing section.

Preferably, the imaging device includes an image selection section which selects a desired image in the plurality of images stored in the storing section, wherein the timetable creating section sets a display time of the desired image selected by the image selection section longer than the display time of the other images.

Preferably, the image selection section displays a list of the images stored in the storing section on the display section when selecting a desired image.

Preferably, the imaging device includes a motion detection section which detects motion of an image by comparing a standard image to another image, wherein the timetable creating section sets the display time of the images according to a result of the motion detection section.

Preferably, the timetable creating section sets the display time of the image such that the display time is increased when the result of the motion detection section is large.

Preferably, the motion detection section detects motion of an area designated in an image displayed on the display section.

The present invention also relates to an imaging method, including: an imaging step which images a subject; a storing step which stores a plurality of images of the subject imaged in the imaging step; a displaying step which displays the plurality of images stored in the storing step; a timetable creating step which creates a timetable in which a display time for each of the plurality of images is set; and a playback step which continuously plays back the plurality of images according to the timetable created in the timetable creating step, and displays the images on the display section.

Preferably the imaging method includes a motion detection step, which detects motion of an image by comparing a standard image to another image, wherein the timetable creating step sets the display time of the images according to a result in the motion detection step.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Next, embodiments of the present invention will be described with reference to the accompanying drawings.

Figure 1:
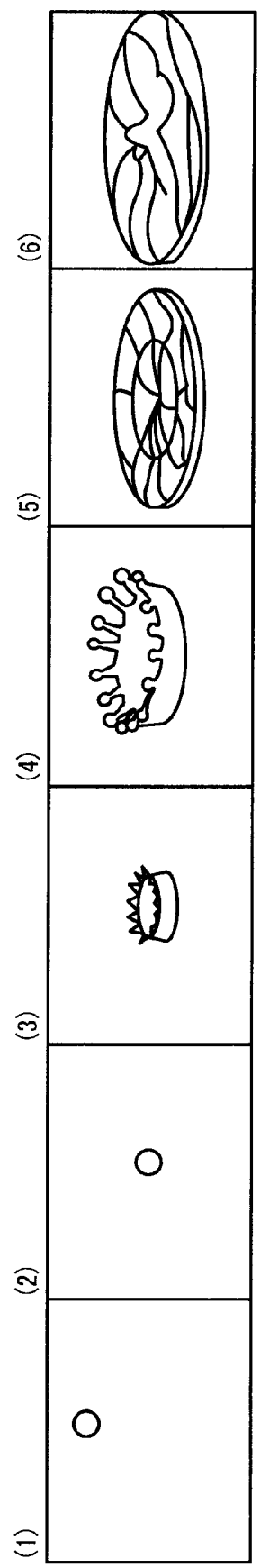
FIG. 1 is a view describing a milk crown phenomenon.
Figure 2:
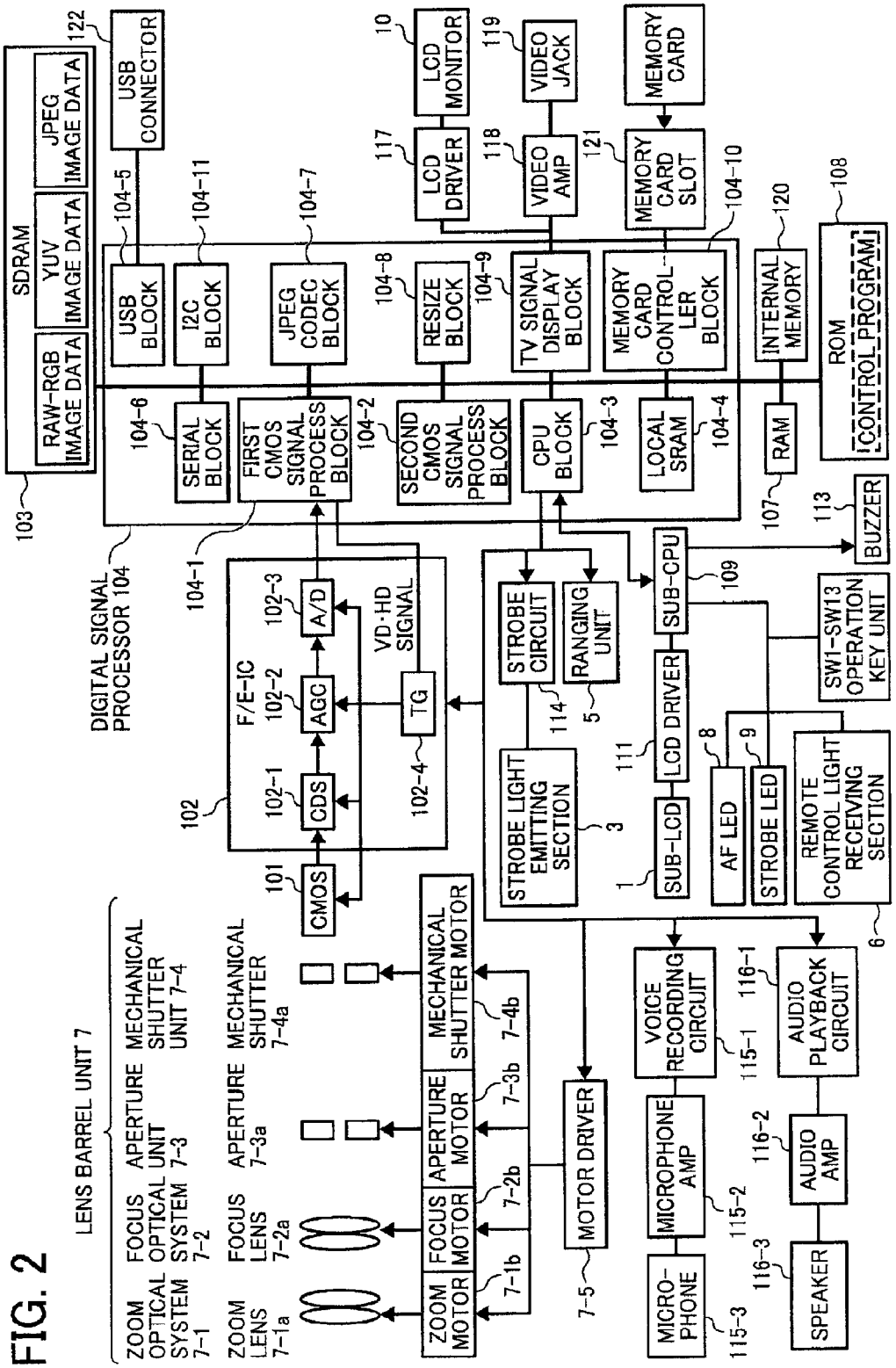
FIG. 2 is a schematic view illustrating a system structure of a digital camera according to embodiments of the present invention.
Figure 3:
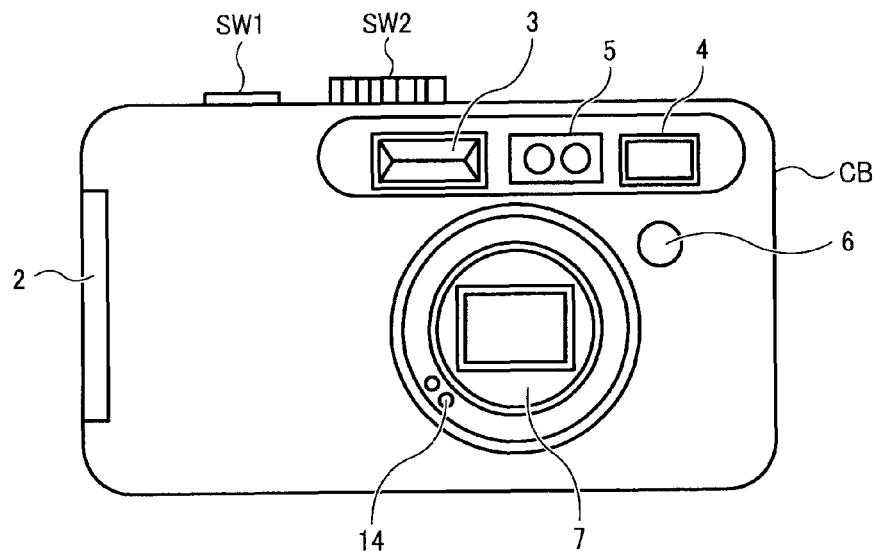
FIG. 3 is an external view (part 1) illustrating a digital camera according to the embodiments of the present invention.
Figure 4:
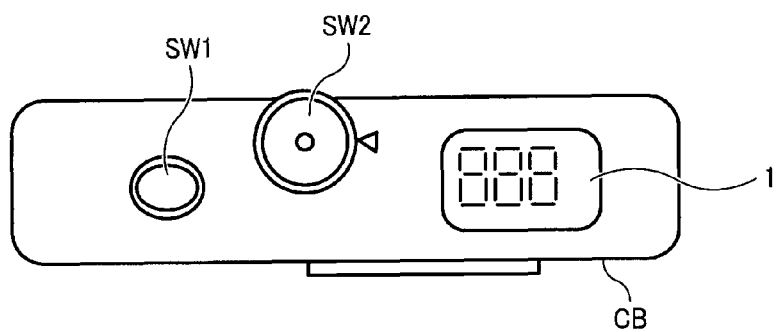
FIG. 4 is an external view (part 2) illustrating the digital camera according to the embodiments of the present invention.
Figure 5:
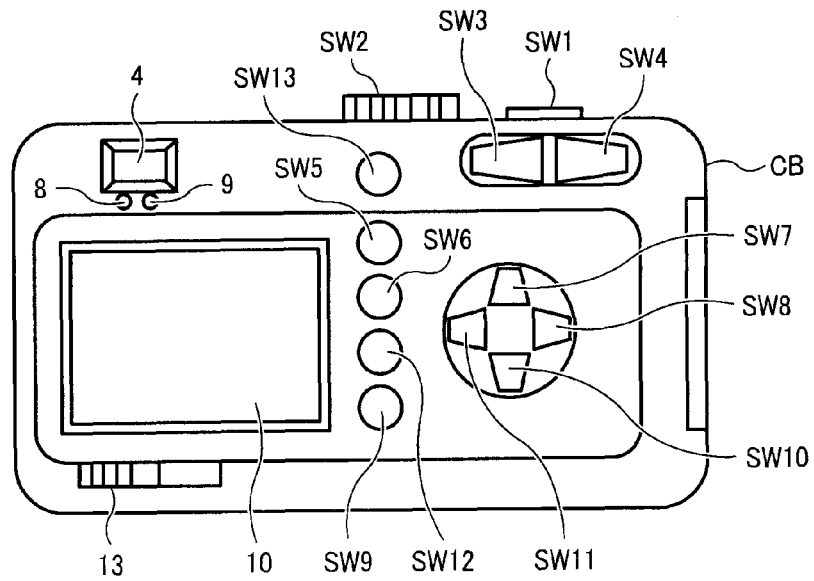
FIG. 5 is an external view (part 3) illustrating the digital camera according to the embodiments of the present invention.

FIG. 2 is a schematic view illustrating a system structure of a digital camera which is an example of an imaging device according to the embodiments of the present invention. FIGS. 3-5 are external views each illustrating the digital camera according to the embodiments of the present invention.

Referring now to FIG. 3-5, the top face of the camera includes a shutter button SW1, a mode dial SW2 and a sub-liquid crystal display (hereinafter called an LCD) 1.

The front face of the camera includes a lens barrel unit 7 having a shooting lens, a strobe light emitting unit 3, an optical finder 4, a ranging unit 5, a remote control light receiving unit 6 and a lid 2 for a memory card loading room and a battery loading room.

The back face of the camera includes the optical finder 4, an LED 8 for AF, an LCD 10, a strobe LED 9, a power source switch 13, a wide end direction zoom switch SW 3, a telephoto end direction zoom switch SW4, a switch SW5 for setting and releasing a self timer, a menu switch SW6, a switch SW7 for upward shift and setting a strobe, a switch SW8 for right shift, a display switch SW9, a switch SW10 for downward shift and a macro mode, a switch SW11 for left shift and confirming an image, an OK switch SW12, and a quick access switch SW13.

The system structure inside the digital still camera is illustrated in FIG. 2. Each section of the system is controlled by a digital signal processor 104 (hereinafter called a processor 104).

The processor 104 includes a first CMOS signal processing block 104-1, a second CMOS signal processing block 104-2, a CPU block 104-3, a local SRAM 104-4, a USB block 104-5, a serial block 104-6, a JPEG/CODEC block 104-7, a RESIZE block 104-8, a TV signal display block 104-9 and a memory card controller block 104-10. These are connected to each other by a bus line.

A SDRAM 103 which stores RAW-RGB image data, YUV image data and JPEG image data is disposed outside the processor 104. The SDRAM 103 is connected to the processor 104 by a bus line.

A RAM 107, an internal memory 120 and a ROM 108 in which a control program is stored are disposed outside the processor 104. These are connected to the processor 104 by a bus line.

The lens barrel unit 7 includes a zoom optical system 7-1 having a zoom lens 7-1a, a focus optical system 7-2 having a focus lens 7-2a, an aperture stop unit 7-3 having an aperture stop 7-3a and a mechanical shutter unit 7-4 having a mechanical shutter 7-4a.

The zoom optical system 7-1, the focus optical system 7-2, the aperture stop unit 7-3 and the mechanical shutter unit 7-4 are driven by a zoom motor 7-1b, a focus motor 7-2b, an aperture stop motor 7-3b and a mechanical shutter motor 7-4b, respectively. Each motor is controlled by a motor driver 7-5 which is controlled by the CPU block 104-3 of the processor 104.

The lens barrel unit 7 includes a shooting lens which focuses a subject image on a CMOS 101 of an imaging element.

The CMOS 101 is an area sensor in which pixels are two-dimensionally disposed, and converts a subject image into image signals to output the image signals to an F/E-IC 102.

The F/E-IC 102 includes a CDS 102-1 which performs correlated double sampling for removing image noise, an AGC 102-2 which performs gain adjustment and AD convertor 102-3 which converts an analogue signal to a digital signal. The F/E-IC 102 performs a predetermined process to each image signal, and converts the image signal to a digital signal to output the digital signal to the first CMOS signal processing block 104-1. These signal processing operations are controlled through a TG 102-4 which generates a timing signal by a vertical drive signal VD and a horizontal drive signal HD output from the firsts CMOS signal process block 104-1 of the processor 104.

The CPU block 104-3 of the processor 104 controls a voice recording operation by a voice recording circuit 115-1. The voice recording circuit 115-1 records an amplified signal of which a voice signal converted by a microphone 115-3 is amplified by a microphone amplifier 115-2 according to a command.

The CPU block 104-3 controls an operation of a sound playback circuit 116-1. The sound playback circuit 116-1 plays back a sound signal recoded in an appropriate memory, and inputs the sound signal into an audio amplifier 116-2 to output sound from a speaker 116-3.

The strobe light emitting section 3 emits light by controlling the operation of the CPU block 104-3 or a strobe circuit 114. The CPU block 104-3 controls the operation of the ranging unit 5.

The CPU block 104-3 is connected to a sub-CPU 109 disposed outside the processor 104. The sub-CPU 109 controls the display of the sub-LCD 1 through an LCD driver 111. The sub-CPU 109 is connected to the AFLED 8, the strobe LED 9, the remote control light receiving section 6, the operation key unit including the switches SW1-SW13 and a buzzer 13.

The USB block 104-5 is connected to a USB connector 122. The serial block 104-6 is connected to an RS-232C connector (not shown) via a serial driver circuit 123-1 (not shown).

The TV display block 104-9 is connected to an LCD 10 via an LCD driver 117, and also connected to a video jack 119 via a video amplifier 118.

The memory card controller block 104-10 is connected to a connector of a memory card slot 121 to which a connector provided in a memory card (not show) is fitted.

Next, an operation of a digital still camera will be schematically described.

If the mode dial SW2 illustrated in FIG. 2 is set to a recording mode, the camera is activated in the recording mode. After the CPU block 104-3 detects that the mode dial SW2 is in the recording mode, the CPU block 104-3 controls the motor driver 7-5 to move the lens barrel unit 7 to a shooting position.

Then, the CMOS 101, the F/E-IC 102, the LCD display 10 and the like are turned on, and the operation of each section is started. After turning on each section, the operation of the finder mode is started.

In the finder mode, the light entered onto the imaging element (CMOS 101) via a lens is converted into electronic signals. The electronic signals are sent to the A/D convertor 102-3 after the signals are sent to the CDS circuit 102-1 as analogue RGB signals.

The RUB signals converted into the digital signals in the A/D convertor 102-3 are converted into YUV signals in the YUV conversion section inside the digital signal processing IC (SDRAM 103), and the YUV signals are written in a frame memory by a memory controller.

The YUV signals are read out by a memory controller, and sent to a TV or the LCD 10 via the TV signal display block 104-9, so that an image is displayed on the TV or the LCD 10. This process is conducted at 1/30 second intervals, and becomes the display of the finder mode in which an image is updated every 1/30 second.

With respect to still image recording, after detecting that the release SW 1 is pressed, exposure setting for recording a still image is performed to the F/E-IC 102 and the CMOS 101, and the mechanical shutter is closed by driving the shutter at the same time that the exposure is completed.

The CPU block 104-3 conducts setting for loading a still image to the CMOS 101 just before the exposure is completed, and loads the data from the CMOS 101 at the same time that the exposure is completed.

The RAW-RGB image data loaded into the SDRAM via the CMOS 101 is converted into the YUV signals similar to the finder mode in the SDRAM 103, and the YUV signals are written into the SDRAM 103.

The YUV signals are read out by the JPEG/CODEC block 104-7, and are written into the SDRAM 103 after JPEG compression is performed to the YUV signals. Then, the signals are stored in a memory card in accordance with a predetermined format such as a DOS after predetermined header information is added to the signals.

Figure 6:
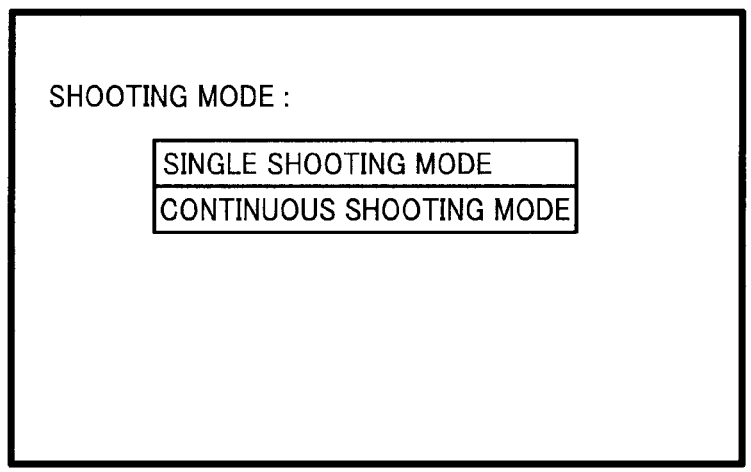
FIG. 6 illustrates a screen for selecting a shooting mode.

If the menu switch SW6 is pressed when the mode dial SW2 is in the recording mode, a continuous shooting mode or a single shooting mode can be selected as illustrated in FIG. 6. With respect to the continuous shooting mode, while the shutter button SW1 is being pressed, the above-described flow for recording a still image is repeatedly conducted, and images are recorded on the SDRAM until the continuous shooting is completed, i.e., the shutter button SW1 is released. Header information is added to each image at the end of the continuous shooting, and the images are stored in a memory card.

In addition, the header information which is added in the continuous shooting mode is as follows.
(1) The total number of images
(2) A serial number of an image
(3) A flag determining whether it is a continuously-shot image or not When the mode dial SW2 is in a playback mode, the images are played back. In this case, the images stored in the memory card are read in the SDRAM 103. After that, the images are converted into the YUV signals in the SDRAM 103, and are written in a frame memory by a memory controller. The YUV signals are read out by the memory controller, and are sent to a TV or the LCD 10 via the TV signal display block 104-9, so that the images are displayed on the TV or the LCD 10.

Embodiment 1

Figure 7:
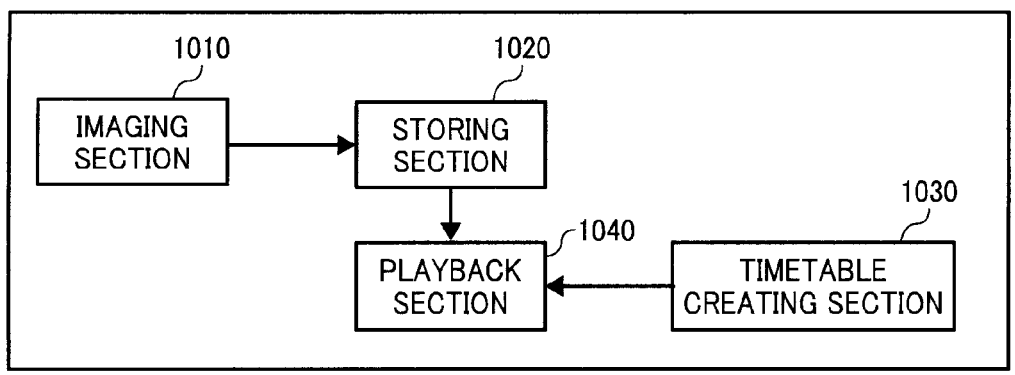
FIG. 7 is a block diagram illustrating a function of a digital camera according to one embodiment of the present invention.

FIG. 7 is a block diagram illustrating a digital camera according to the embodiment of the present invention. The digital camera includes an imaging section 1010, a recording section 1020, a timetable creating section 1030 and a playback section 1040.

The recording section 1020 stores (storing step) image data of a subject imaged (imaging step) by the imaging section 1010. In this case, the above header information (1), (2) and (3) are added to each image data, and each image data associated with the above (1), (2) and (3) is stored.

The timetable creating section 1030 creates a timetable by calculating display time of each image in continuous playback such that image data desired by a user is slowly played back (timetable creating step).

The playback section 1040 refers to the timetable created in the timetable creating section 103, and continuously plays back the images stored in the storing section 102 (playback step). The playback section 1040 also displays a list of image data so that a user can select desired image data.

Figure 8:
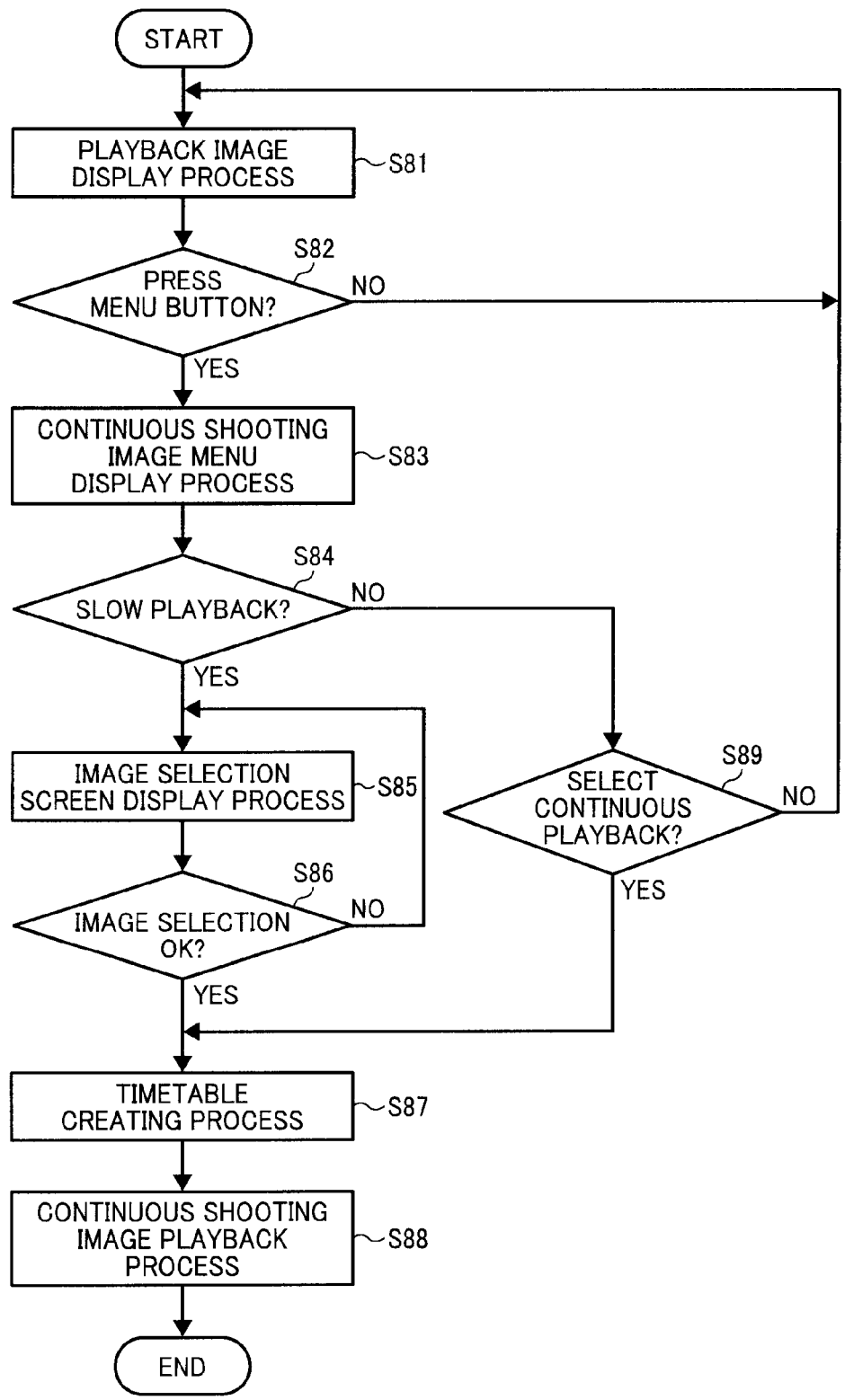
FIG. 8 is a flow chart in playback of a digital camera according to one embodiment of the present invention.

The operation of the digital still camera according to Embodiment 1 of the present invention will be described in detail with reference to the flow chart in FIG. 8 regarding the image playback.

Figure 9:
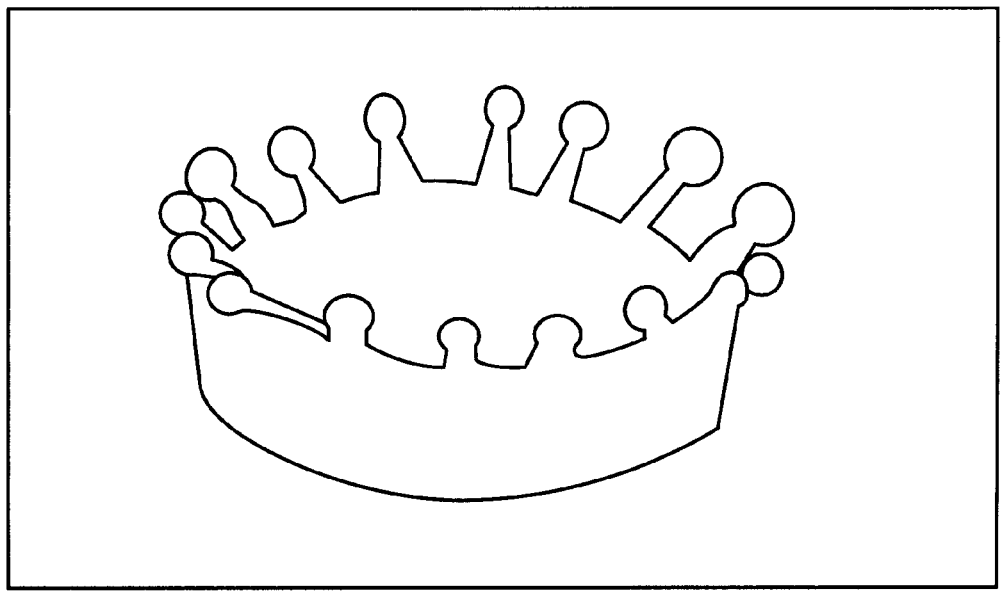
FIG. 9 illustrates a display example of a playback image.

At first, when the mode dial SW2 is in the playback mode, a playback image is displayed on the LCD 10 as illustrated in FIG. 9 (step S81).

Figure 10:
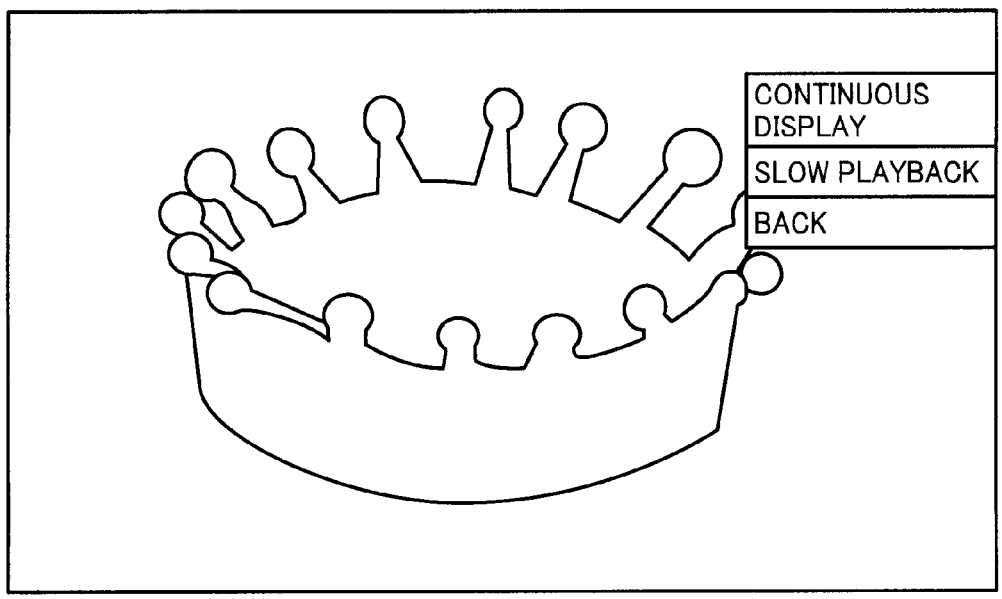
FIG. 10 illustrates an example of a screen for selecting a continuous shooting display method.

In this case, if the menu button SW6 is pressed (step S82) and the currently displayed image is one of the continuously-shot images, the continuous shooting image menu as illustrated in FIG. 10 is displayed (step S83). The currently displayed image is determined whether it is one of the continuously-shot images or not according to the above-described flag (3) of the header information of the image. If the currently displayed image is one of the continuously-shot images, for example "1" is set to this flag. Three items such as "continuous display", "slow playback" and "back" are displayed on the continuous shooting image menu.

Figure 11:
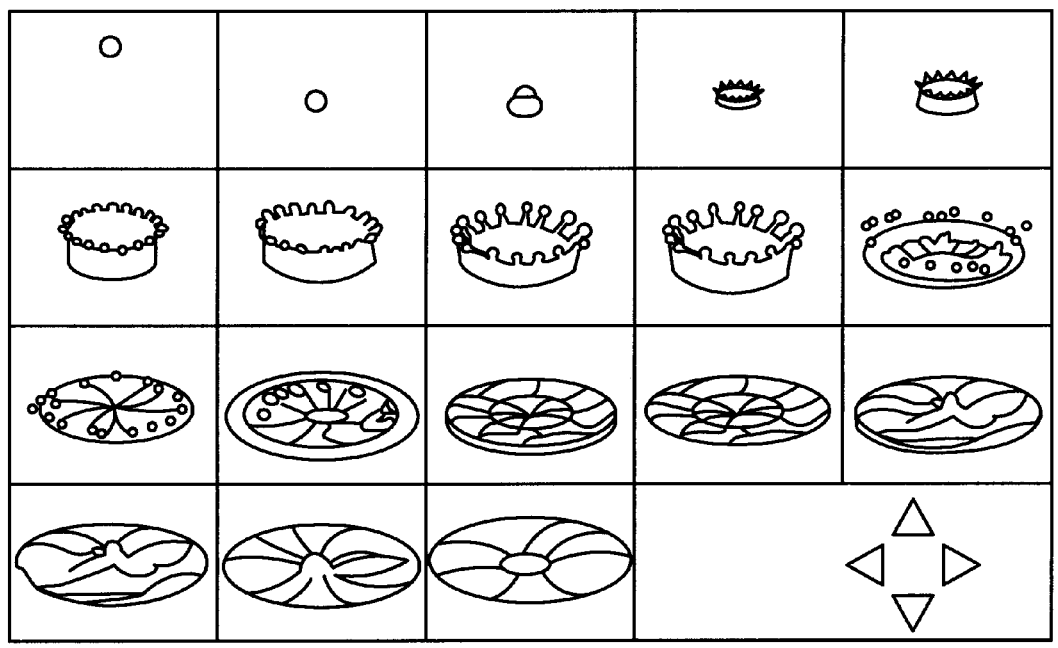
FIG. 11 illustrates a display example of a plurality of images.
Figure 12:
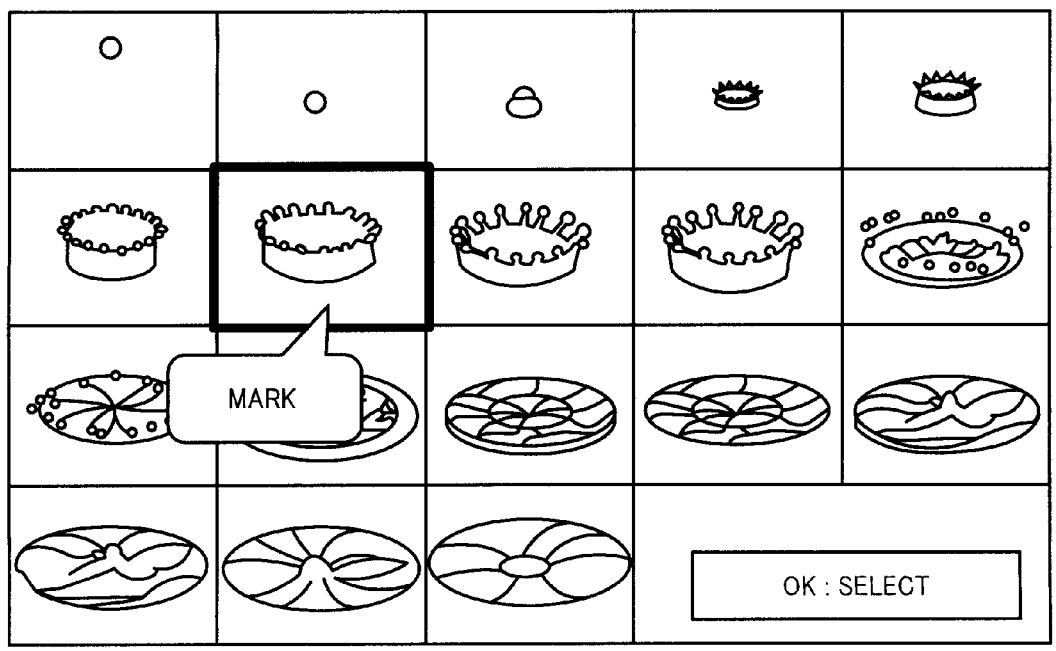
FIG. 12 illustrates a display example when selecting an image.

If "slow playback" is selected (step S84), the display is changed to an image display on which a plurality of images are displayed in a matrix as illustrated in FIG. 11. A plurality of images is displayed in the sequence such that the above-described serial number is increased from the upper left to the lower right on the matrix image display. More particularly, the image on the upper left is the oldest image and the image of the lower right is the newest image on this matrix image display. In addition, these images are only continuously-shot images. By pressing the up, down, right and left switches (SW7, 8, 10, 11), a desired image can be selected from the images displayed in the matrix. The selected image is marked as illustrated in FIG. 12. Accordingly, an image for slow playback can be selected (step S85).

Referring to FIG. 12, the seventh image counted from the upper left to the lower right is selected. Next, a process which creates a timetable for slowly playing back the seventh image is conducted (step S87).

Table 1 illustrates a timetable. This timetable is set such that the selected seventh image is displayed for 1 second and the other images are displayed for a time shorter than 1 second. In general, images are displayed at 30 frames per second, so that the shortest display time is 0.033-second (1/30 second).

If the mode dial SW2 is set to a playback mode, the playback image is displayed on the LCD 10 (step S141) as illustrated in FIG. 9.

Figure 15:
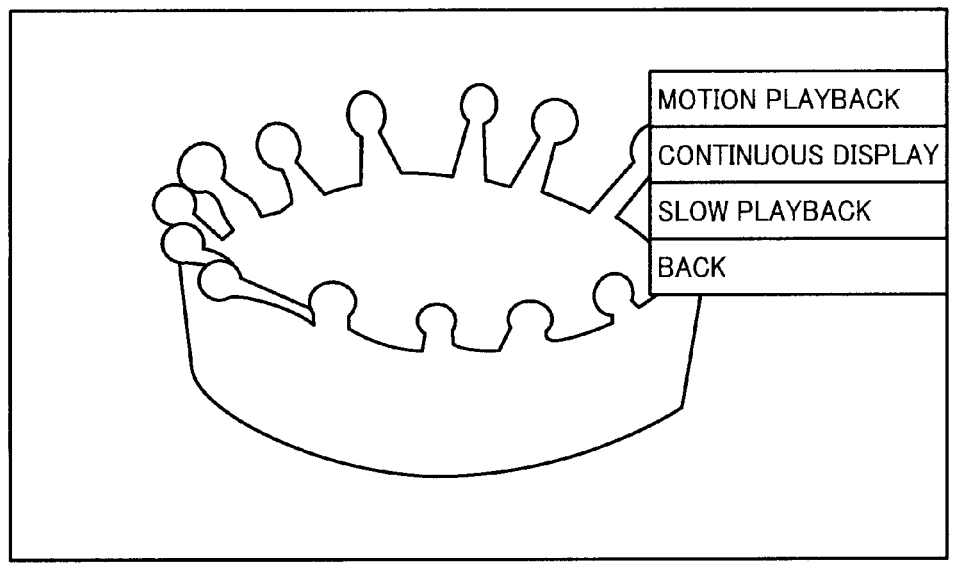
FIG. 15 illustrates another example of a screen for selecting a continuous shooting display method.

If the menu button SW6 is pressed (step S142), and the currently displayed image is one of the continuously-shot images, the continuous shooting image menu is displayed as illustrated in FIG. 15. The currently displayed image is determined whether it is one of the continuously-shot images or not according to the above-described flag (3) of the header information of the image. If the currently displayed image is one of the continuously-shot images, for example, "1" is set to this flag. Four items such as "motion playback", "continuous display", "slow playback" and "back" are displayed on the continuous shooting image menu.

TABLE 1

| FRAME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| SECOND | 0.033 | 0.033 | 0.033 | 0.033 | 0.20 | 0.80 | 1.00 | 0.80 | 0.20 | 0.033 | 0.033 | 0.033 | 0.033 | 0.033 |
| MARK | | | | | | | ○ | | | | | | | |

On the other hand, if "continuous display" is selected instead of "slow playback" in the continuous shooting image menu display state (step S89), the timetable is set such that continuously-shot images are displayed at equal intervals (in this case, 0.033-second) from the first image as illustrated in Table 2.

Figure 16:
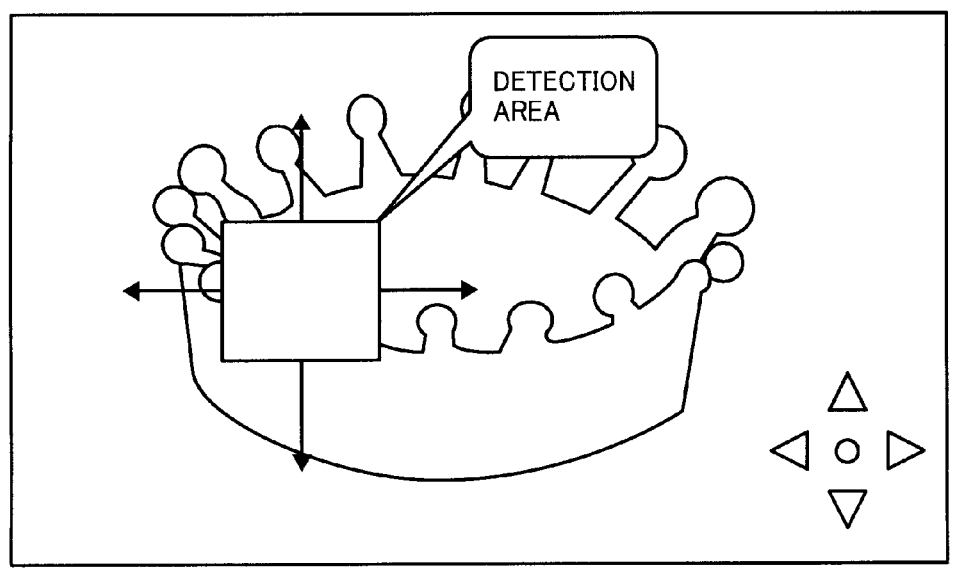
FIG. 16 illustrates an example of a screen for selecting a motion detection area.

If "motion playback" is selected (step S144), the motion detection area selection screen process (step S145) is conducted. In the motion detection area selection screen process, as illustrated in FIG. 16, a position (coordinates) of an area for selection is moved by pressing the up, down, right and left

TABLE 2

| FRAME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| SECOND | 0.033 | 0.033 | 0.033 | 0.033 | 0.033 | 0.033 | 0.033 | 0.033 | 0.033 | 0.033 | 0.033 | 0.033 | 0.033 | 0.033 |

If "back" is selected without selecting "slow playback" and "continuous display", the flow goes back to the playback image display process (step S81).

The continuous shooting image playback process (Step S88) is performed in accordance with the timetable created in the timetable creating process of step S87. In the playback, a process which displays, according to a timetable, images starting from an image having the smallest serial number in accordance with the above-described serial number (2) of the header information is conducted.

In addition, the images for the continuous playback are not limited to continuously-shot images. For example, a plurality of shot images can be continuously played back in order according to a timetable.

Second Embodiment

Figure 13:
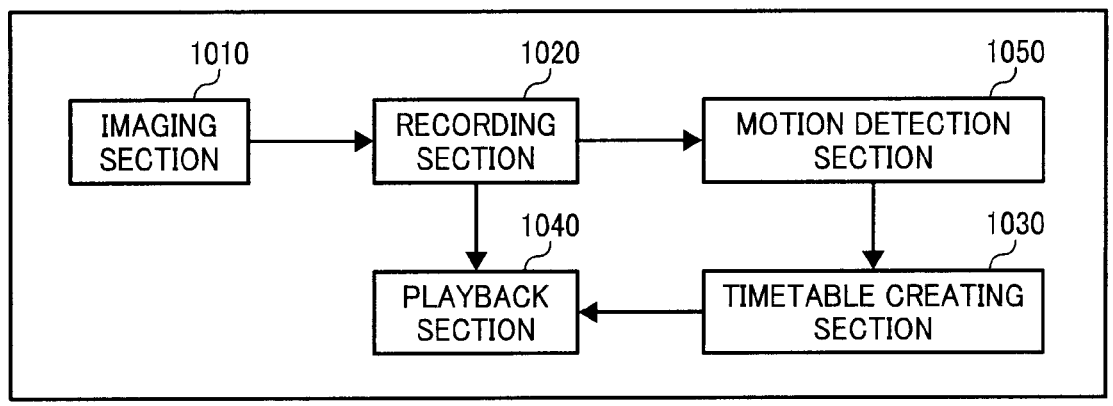
FIG. 13 is a block diagram illustrating a function of a digital camera according to another embodiment of the present invention.

FIG. 13 is a block diagram illustrating function of a digital camera according to the embodiment of the present invention. This digital camera includes an imaging section 1010, a storing section 1020, a timetable creating section 1030, a playback section 1040 and a motion detection section 1050.

The motion detection section 1050 detects motion of an image according to change in an image in a designated motion detection area (motion detection step). The timetable creating section 103 creates a timetable such that the detected motion is clearly displayed for a user (for example, a display speed of an image is lowered when a result of motion detection is large).

Figure 14:
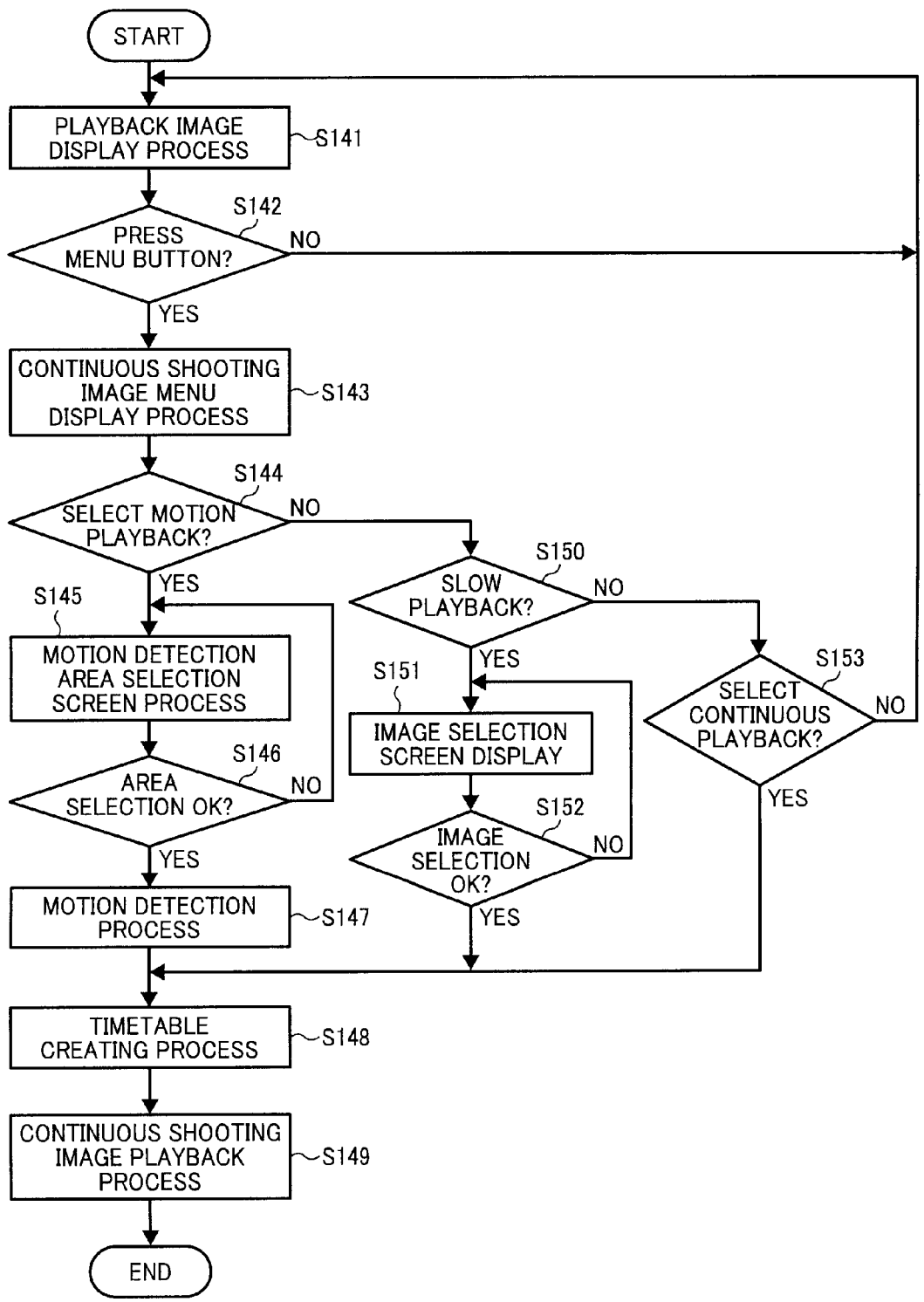
FIG. 14 is a flow chart in playback of a digital camera according to another embodiment of the present invention.

Next, the operation of the digital camera according to Embodiment 2 will be described in details with reference to the flow chart in FIG. 14 regarding image playback.

switches (SW7, 8, 10, 11). The area can be selected until the OK switch SW12 is pressed.

If the area is selected and the OK switch SW12 is pressed (step S146), the motion detection area is determined. Then, the motion detection process is started among the images (step S147). Various methods are proposed regarding the motion detection, and the method is not limited to any of those. In this embodiment, a method of using a difference of histograms is used.

Figure 17:
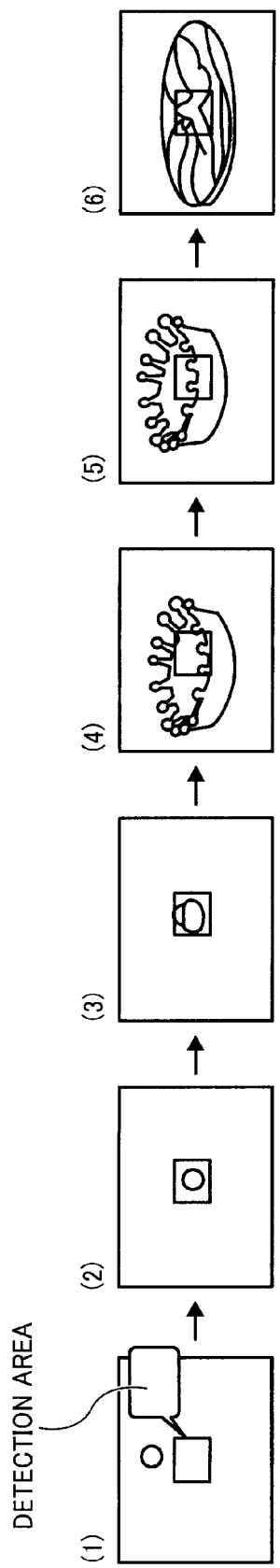
FIG. 17 is a view describing the motion detection.
Figure 18:
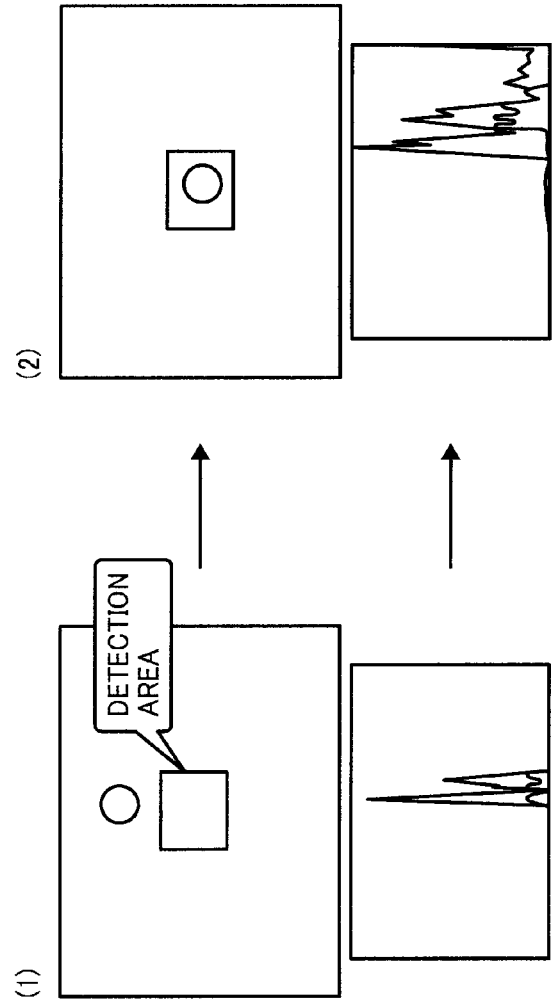
FIG. 18 illustrates an example of a histogram in the motion detection.

FIG. 17 illustrates continuously-shot images (1) to (6). At first, as illustrated in FIG. 18, a histogram of an image parameter (for example, brightness of an image) is prepared in each detection area of each image (1) to (6) illuminated in FIG. 17. Then, the histogram of (1) in FIG. 17 which is a start image of the continuously-shot images is compared to the histogram of each image (2) to (6), and the display time of each image is determined according to the difference. For example, if an image is in a condition which becomes (2) in FIG. 18 from (1) in FIG. 18, it is determined that the difference between the histograms is large.

A timetable is created according to the result of the motion detection (Step S148). In this case, the display time of an image having the largest difference of histograms is set to 1 second and display time of an image having the smallest difference of histograms is set to 0.033-second (1/30 second), and the display time of the other images is set between 0.033-second to 1 second according to the difference. The following Table 3 is a timetable for continuous shooting of a milkcrown phenomenon, which is created as described above.

TABLE 3

| IMAGE | 1 | → | 2 | → | 3 | → | 4 | → | 5 | → | 6 |
|---|---|---|---|---|---|---|---|---|---|---|---|
| IMAGE NUMBER | 0 | 10 | 20 | 30 | 40 | 50 | 60 | 70 | 80 | 90 | 100 |
| DISPLAY SECOND | 0.033 | 0.1 | 0.2 | 0.4 | 0.8 | 0.9 | 1 | 0.8 | 0.4 | 0.2 | 0.1 |

On the other hand, when "slow playback" is selected on the above-described continuous shooting image menu display (Step S90), as illustrated in FIG. 11, the display is changed to a display on which a plurality of images is displayed in a matrix. At this time, only continuously-shot images are displayed.

In this case, by pressing the upper, lower, right and left switches (SW7, 8, 10, 11), a desired image can be selected from the images displayed in the matrix. The selected image is marked as illustrated in FIG. 12. As described above, an image for slow playback can be selected (Step S151). The seventh image counted from the upper left to the lower right is selected in FIG. 12.

Next, a process of creating a timetable which slowly plays back the seventh image is conducted (step S148). Table 1 illustrates the timetable. This timetable is set such that the selected seventh image is displayed for 1 second and the other images are displayed for a time shorter than 1 second. In general, images are displayed 30 frames per second on a TV monitor and the like, so that the shortest display time is set to 0.033-second (1/30 second).

Meanwhile, when "continuous display" is selected and not "slow playback" in the above continuous shooting image menu display state (step S153), the timetable is set such that continuously-shot images are displayed at equal time intervals (here, 0.033-second) from the first image as illustrated in Table 2.

If "back" is selected and not "slow playback" and "continuous display", the flow goes back to the playback image display process (step S141).

Then, the continuous shooting image playback process (Step S149) is conducted in accordance with the timetable created in the timetable creating process of step S148. In the playback, a process which displays, according to the timetable, images starting from the image having the small serial number in accordance with the above-described serial number (2) of the header information is conducted.

In the above embodiments, one desired image is selected for "slow playback", but two or more desired images can be selected. Therefore, the usability of the camera can be improved.

In Embodiment 2, the motion detection using a histogram is performed; however, a method of detecting motion is not limited to the method described in Embodiment 2. It is more preferable to use a more strict method, for example, a method of detecting a motion vector by optical flow. Moreover, the motion can be determined according the change in the entire images without selecting an area.

According to the embodiments of the present invention, in the continuous playback of images continuously shot at high speed, a desired image can be slowly played back, and the other images can be played back at high speed. Therefore, a desired image can be easily confirmed without confirming a lot of images one by one.

According to the embodiments of the present invention, when continuously playing back images continuously shot at high speed, a desired image can be easily identified by playing pack a desired image (continuous shooting area) at low speed without identifying all of the continuously-shot images one by one.

Although the embodiments of the present invention have been described above, the present invention is not limited thereto. It should be appreciated that variations may be made in the embodiments described by persons skilled in the art without departing from the scope of the present invention.

What is claimed is:

1. An imaging device, comprising:
    an imaging section which images a subject;
    a storing section which stores a plurality of images of the subject imaged by the imaging section;
    a display section which displays the plurality of images stored in the storing section;
    a timetable creating section which creates a timetable in which a display time is set for each image of the plurality of images; and
    a playback section which continuously plays back the plurality of images according to the timetable created by the timetable creating section, and displays the images on the display section, and wherein the timetable creating section is further configured such that, if a "slow playback" option is executed, the display time for a desired one of the plurality of images is set to a longest display time, the display times for consecutive images on either side of the desired one of the plurality of images are set to be incrementally shorter than a previous image until a minimum display time is reached, and the display time for each of the remaining ones of the plurality of images is set to the minimum display time.

2. The imaging device according to claim 1, wherein a flag which determines whether or not an image is a continuously-shot image is applied to each of the images, and the images each applied with the flag are stored in the storing section.

3. The imaging device according to claim 1, comprising an image selection section which selects the desired image in the plurality of images stored in the storing section.

4. The imaging device according to claim 3, wherein the image selection section displays a list of the images stored in the storing section on the display section when selecting the desired image.

5. The imaging device according to claim 1, comprising a motion detection section which detects motion of an image by comparing a standard image to another image, wherein, if a "motion playback" option is executed, the result of the motion detection section determines the display times set by the timetable creating section.

6. The imaging device according to claim 5, wherein the timetable creating section sets the display time of the image such that the display time is increased when the result of the motion detection section is large.

7. The imaging device according to claim 5, wherein the motion detection section detects motion of an area designated in an image displayed on the display section.

\* \* \* \* \*